(12) United States Patent
Kanzaki

(10) Patent No.: US 11,249,274 B2
(45) Date of Patent: Feb. 15, 2022

(54) LENS UNIT

(71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 16/626,324

(22) PCT Filed: Jun. 11, 2018

(86) PCT No.: PCT/JP2018/022174
§ 371 (c)(1),
(2) Date: Dec. 24, 2019

(87) PCT Pub. No.: WO2019/003878
PCT Pub. Date: Jan. 3, 2019

(65) Prior Publication Data
US 2020/0116971 A1   Apr. 16, 2020

(30) Foreign Application Priority Data
Jun. 29, 2017 (JP) .............................. JP2017-127188

(51) Int. Cl.
*G02B 1/10* (2015.01)
*G02B 7/02* (2021.01)
(Continued)

(52) U.S. Cl.
CPC ............. *G02B 7/021* (2013.01); *G02B 1/041* (2013.01); *G02B 1/10* (2013.01); *G02B 13/004* (2013.01); *G02B 27/0018* (2013.01)

(58) Field of Classification Search
CPC ........ G02B 7/021; G02B 7/022; G02B 1/041; G02B 1/10; G02B 13/004; G02B 27/0018; B29D 11/00
See application file for complete search history.

(56) References Cited

U.S. PATENT DOCUMENTS 9,964,676 B2   5/2018  Nagahama et al.
2006/0018036 A1*  1/2006  Huang ................... G02B 7/022
                                          359/694
(Continued)

FOREIGN PATENT DOCUMENTS

CN    104570168    4/2015
CN    104871056    8/2015
(Continued)

OTHER PUBLICATIONS

"International Search Report (Form PCT/ISA/210) of PCT/JP2018/022174," dated Sep. 4, 2018, with English translation thereof, pp. 1-4.

(Continued)

*Primary Examiner* — Balram T Parbadia
(74) *Attorney, Agent, or Firm* — JCIPRNET

(57) ABSTRACT

Provided is a lens unit. A second lens is provided with a flange surface section that surrounds a lens surface. An image-side flange surface has an image-side flange surface inner-circumferential section which is shaped like a ring-shaped groove, and also has a ring-shaped image-side flange surface outer-circumferential section formed to the outside of the inner-circumferential section. The image-side flange surface inner-outer circumferential section is coated with black ink. The image-side flange surface outer-circumferential section is provided with boss-shaped positioning surface at six equidistant locations along the outer circumference. Ejector pin contact sections are formed between adjacent positioning surface, and said contact sections contact the ejector pins at the time of separation from the mold during resin molding.

9 Claims, 9 Drawing Sheets

(51) Int. Cl.
*G02B 1/04* (2006.01)
*G02B 13/00* (2006.01)
*G02B 27/00* (2006.01)

(56) References Cited

U.S. PATENT DOCUMENTS

| | | | | |
|---|---|---|---|---|
| 2006/0140623 A1* | 6/2006 | Yu | ............... | G03B 17/02 396/529 |
| 2008/0316620 A1* | 12/2008 | Huang | ............... | G02B 7/022 359/819 |
| 2009/0015945 A1* | 1/2009 | Chen | ............... | G02B 7/021 359/819 |
| 2009/0174954 A1* | 7/2009 | Hara | ............... | G02B 7/021 359/819 |
| 2011/0050988 A1* | 3/2011 | Yano | ............... | H04N 5/2257 348/374 |
| 2011/0102901 A1* | 5/2011 | Lin | ............... | G02B 7/022 359/601 |
| 2013/0027788 A1* | 1/2013 | Yen | ............... | G02B 13/0045 359/763 |
| 2013/0050850 A1* | 2/2013 | Lin | ............... | G02B 7/021 359/738 |
| 2013/0176625 A1* | 7/2013 | Chen | ............... | G02B 3/0075 359/619 |
| 2014/0016216 A1* | 1/2014 | Mori | ............... | G02B 7/02 359/811 |
| 2014/0029114 A1* | 1/2014 | Kim | ............... | G02B 7/021 359/709 |
| 2014/0104691 A1* | 4/2014 | Chang | ............... | G02B 13/0035 359/611 |
| 2014/0160581 A1* | 6/2014 | Cho | ............... | G02B 7/02 359/738 |
| 2014/0168796 A1* | 6/2014 | Mori | ............... | B29C 45/1671 359/819 |
| 2014/0233115 A1* | 8/2014 | Akutsu | ............... | B29D 11/00009 359/819 |
| 2014/0254034 A1* | 9/2014 | Lyu | ............... | G02B 7/021 359/819 |
| 2015/0103407 A1 | 4/2015 | Chen | | |
| 2015/0198777 A1* | 7/2015 | Yan | ............... | G02B 7/021 359/793 |
| 2015/0260941 A1* | 9/2015 | Yan | ............... | G02B 7/003 359/771 |
| 2015/0260942 A1* | 9/2015 | Yan | ............... | G02B 7/021 359/771 |
| 2015/0260943 A1* | 9/2015 | Yan | ............... | G02B 7/021 359/771 |
| 2015/0323708 A1 | 11/2015 | Hashimoto et al. | | |
| 2015/0331219 A1* | 11/2015 | Chen | ............... | G02B 7/021 359/771 |
| 2016/0085046 A1* | 3/2016 | Kim | ............... | G02B 7/026 359/830 |
| 2016/0091690 A1* | 3/2016 | Nakajima | ............... | G02B 7/028 359/754 |
| 2016/0349504 A1* | 12/2016 | Kim | ............... | G02B 13/0045 |
| 2017/0108627 A1* | 4/2017 | Chou | ............... | G02B 13/0045 |
| 2017/0176649 A1* | 6/2017 | Chang | ............... | G02B 13/0045 |
| 2017/0227735 A1* | 8/2017 | Chou | ............... | G02B 13/0045 |
| 2018/0196171 A1* | 7/2018 | Hsu | ............... | G02B 7/026 |
| 2018/0348466 A1* | 12/2018 | Hirth | ............... | G02B 21/02 |

FOREIGN PATENT DOCUMENTS

| | | |
|---|---|---|
| CN | 105620066 | 6/2016 |
| CN | 106154369 | 11/2016 |
| JP | 2012185240 | 9/2012 |
| JP | 2014119707 | 6/2014 |
| JP | 2014164239 | 9/2014 |
| JP | 2016001261 | 1/2016 |
| JP | 2016106239 | 6/2016 |
| JP | 2016191808 | 11/2016 |
| JP | 2016191809 | 11/2016 |
| JP | 2016218285 | 12/2016 |

OTHER PUBLICATIONS

"Office Action of China Counterpart Application", dated Apr. 13, 2021, with English translation thereof, p1-p12.
"Office Action of China Counterpart Application", dated Oct. 9, 2021, with English translation thereof, p1-p12.

* cited by examiner

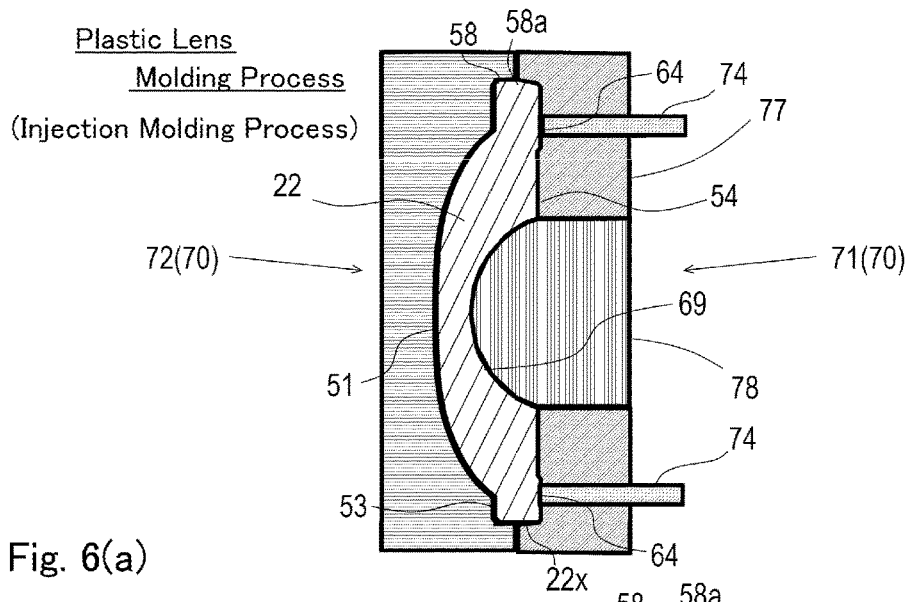
Fig. 6(a) Plastic Lens Molding Process (Injection Molding Process)
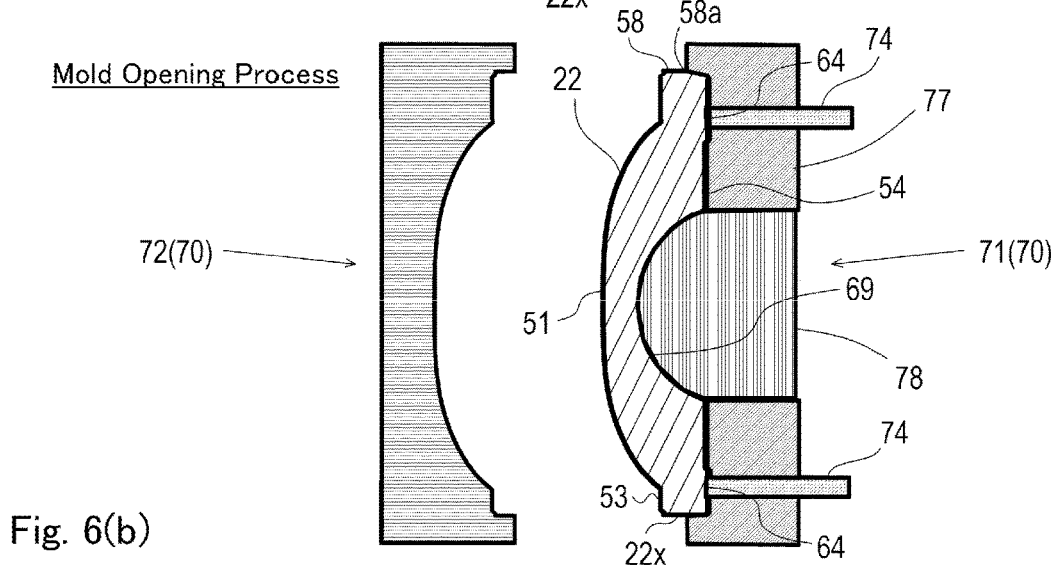
Fig. 6(b) Mold Opening Process
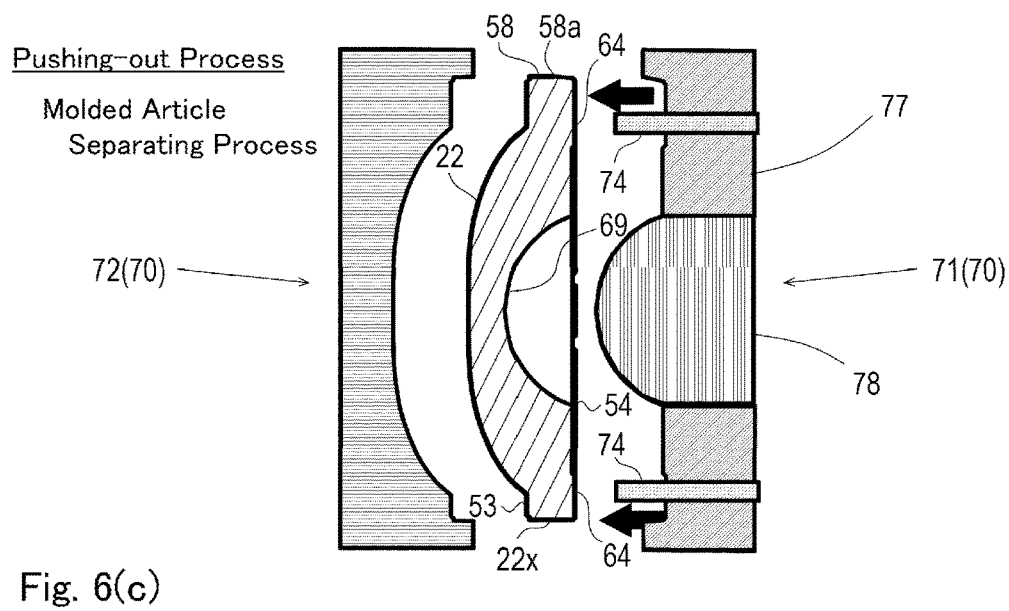
Fig. 6(c) Pushing-out Process / Molded Article Separating Process

LENS UNIT

CROSS-REFERENCE TO RELATED APPLICATION

This application is a 371 application of the international PCT application serial no. PCT/JP2018/022174, filed on Jun. 11, 2018, which claims the priority benefit of Japan application no. 2017-127188, filed on Jun. 29, 2017. The entirety of each of the above-mentioned patent applications is hereby incorporated by reference herein and made a part of this specification.

TECHNICAL FIELD

The present invention relates to a lens unit including a plurality of lenses and a lens-barrel which holds the lenses.

BACKGROUND ART

In a lens unit, a structure may be adopted that a light shielding film (light shielding layer) is formed on an outer peripheral part which surrounds a lens face on an outer side in a radial direction to prevent incidence and reflection of unnecessary light (see, for example, Patent Literatures 1 and 2).

In a case that a lens is to be held by a lens barrel, when a flange part is formed in the lens, the lens can be easily held by the lens barrel. On the other hand, when a flange part is formed, for example, unnecessary light incident on the flange part is overlapped with necessary effective light and a ghost or flare may be generated.

Therefore, a structure has been known that black coating as a light shielding film is applied to a flange face of a first lens which is disposed on the most object side. In this case, a second lens and subsequent lenses (image side) are also formed with a flange part and thus a ghost and the like may be generated by the flange parts of the second lens and the subsequent lenses. However, restraint of generation of a ghost and the like caused by the flange parts of the second lens and the subsequent lenses has not been required.

CITATION LIST

Patent Literature

[Patent Literature 1] Japanese Patent Laid-Open No. 2016-191808
[Patent Literature 2] Japanese Patent Laid-Open No. 2016-191809

SUMMARY

Problems to be Solved by the Invention

In a current camera market, demand for an on-vehicle sensing camera and the like is increasing and a further high-performance camera is required. In this case, occurrence of a ghost and the like (ghost occurred at view angles of 85° and) 90° which has not been required to prevent the occurrence so far is required to be restrained and thus, black coating is required to apply to the flange parts of the second lens and the subsequent lenses which are considered to be factors causing to occur the ghost. However, when black coating is applied to the flange parts of the second lens and the subsequent lenses, a gap space interval between the respective lenses is shifted by a thickness of the black coating. Further, the thickness of India ink applied on a lens may occur variation of several decades μm. Therefore, when black coating is applied, a situation may occur that required lens performance is not satisfied, and they are in a trade-off relationship and thus, a technique for a countermeasure has been required. In this case, the first lens is commonly designed so as not to affect lens performance significantly and thus, a thickness of the black coating can be substantially ignored.

In view of the problem described above, the present invention provides a lens unit capable of suppressing a ghost occurred by a flange part of the second lens and preventing degradation of optical performance due to black coating applied to a flange part surrounding a lens face of the second lens.

Means to Solve the Problems

The present invention provides a lens unit including a first lens which is disposed on the most object side, a plurality of lenses which are disposed on an image side with respect to the first lens, and a lens-barrel which holds the first lens and the plurality of the lenses. Among the plurality of the lenses, a second lens which is disposed on the most object side is a plastic lens, and the second lens is provided with a flange part which surrounds a lens face of the second lens. An image side flange face of the flange part is provided with a positioning face, which is formed on an outer peripheral side and is protruded in an optical axis direction, and a first step part which is provided on an inner peripheral side with respect to the positioning face and is recessed to the object side in the optical axis direction with respect to the positioning face, and black coating is applied to the first step part. A boundary surface between the image side flange face and air which may be a cause of reflection is eliminated and thus, the inner face reflectance can be reduced. In other words, since black coating is applied to the image side flange face of the flange part of the second lens, a ghost generated by the flange part of the second lens can be suppressed. Further, since the first step part is formed so as to be located on the object side in the optical axis direction with respect to the positioning face, the position in the optical axis direction of the second lens does not change due to a thickness of the black coating. Therefore, the optical performance may not be deteriorated.

Further, it may be structured that the positioning face is formed at a plurality of positions along an outer periphery of the flange part, and a second step part which is lower than the positioning face is formed between the positioning faces. When the second step part is provided, the second step part can be utilized as a push-out portion by an ejector pin which is used for separating the second lens from a metal mold at the time of molding of the second lens.

Further, it may be structured that the second step part is formed with an ejector pin abutting part, and at least a part of the ejector pin abutting part is formed at a position facing an object side flange face of the flange part. In the pushing-out process by the ejector pin, a force of the ejector pin can be prevented from directly acting on an object side lens face and an image side lens face and, in other words, the lens face can be prevented from being deformed or the like.

Further, it may be structured that, in the lens face of the second lens, a boundary portion between the image side lens face and the first step part is formed with a minute ring-shaped protruded part which is protruded to the image side in the optical axis direction. India ink can be prevented from spreading over the image side lens face by the ring-shaped protruded part.

Further, it may be structured that the first step part is a ring-shaped groove which is recessed to the object side in the optical axis direction with respect to the second step part. When the first step part is formed to be a ring-shaped groove, an applying position and an applying amount of India ink can be easily adjusted.

Further, it may be structured that the first step part is an uneven surface on which minute protrusions and recesses are provided. The second lens is a plastic lens and India ink is easily shed and repelled. In other words, India ink having been applied is not stable. However, the India ink having been applied can be stabilized by the uneven surface and coating can be optimized.

Further, it may be structured that a third step part which is recessed to the object side in the optical axis direction is formed in a boundary portion between the image side lens face and the first step part. The boundary portion is provided with an angle, for example, of 90 degrees by the third step part and thus, the surface tension of the India ink is easily generated and the India ink can be prevented from spreading to the image side lens face.

Further, it may be structured that a light shielding sheet is provided between the second lens and a third lens adjacent to the second lens on the image side. Light can be prevented from passing to the image side by the light shielding sheet.

Effects of the Invention

According to the present invention, a ghost generated by the flange part of the second lens can be suppressed and degradation of optical performance due to black coating applied to the flange part surrounding the lens face of the second lens can be prevented.

BRIEF DESCRIPTION OF THE DRAWINGS

FIGS. 6(a), 6(b) and 6(c) are views schematically showing a molding process of the second lens in accordance with the first embodiment.

DESCRIPTION OF THE EMBODIMENTS

An embodiment for carrying out the invention (hereinafter, referred to as an "embodiment") will be described below with reference to the accompanying drawings.

First Embodiment

Figure 1A:
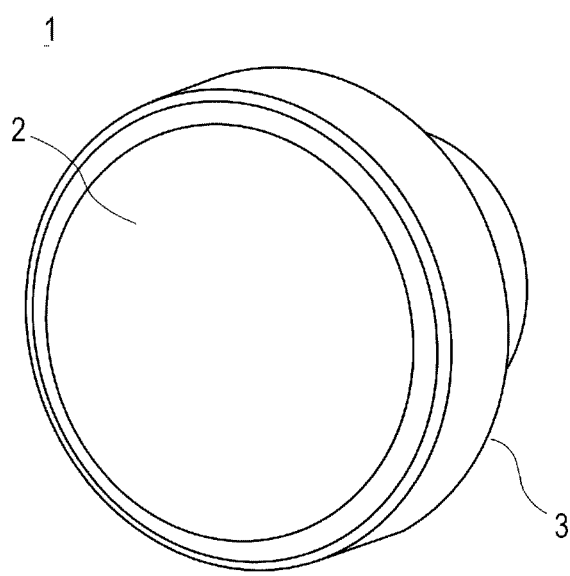
FIGS. 1(a), 1(b) and 1(c) are views showing an entire lens unit in accordance with a first embodiment.
Figure 1B:
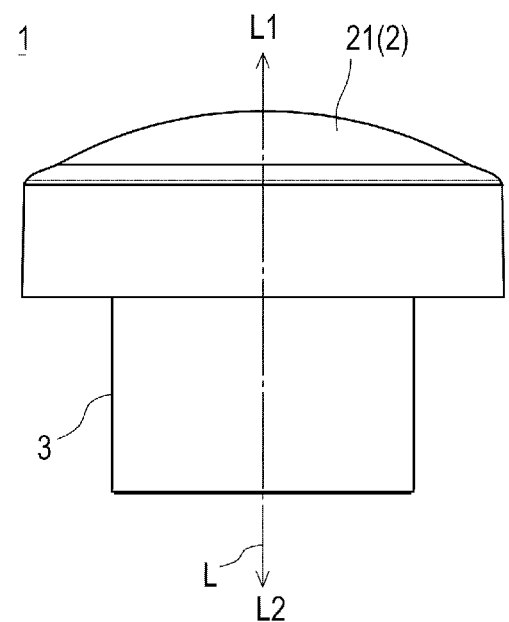
Figure 1C:
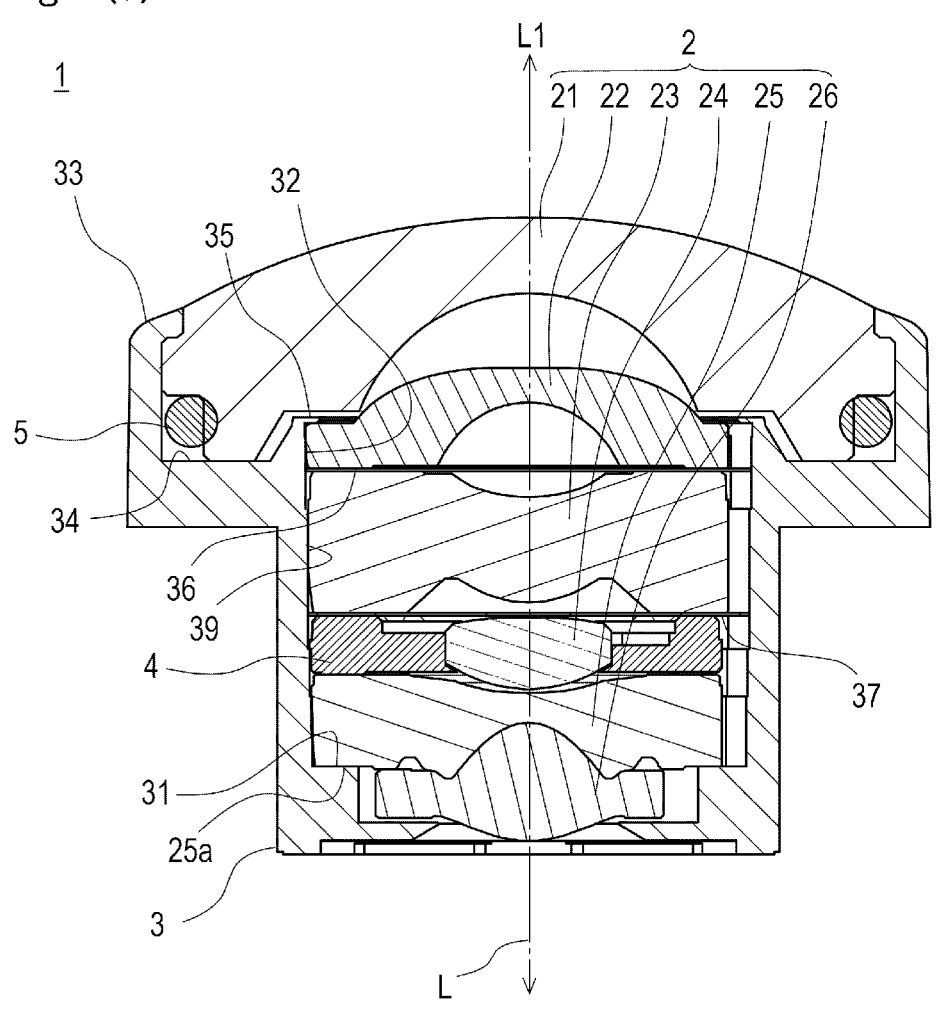
Figure 2:
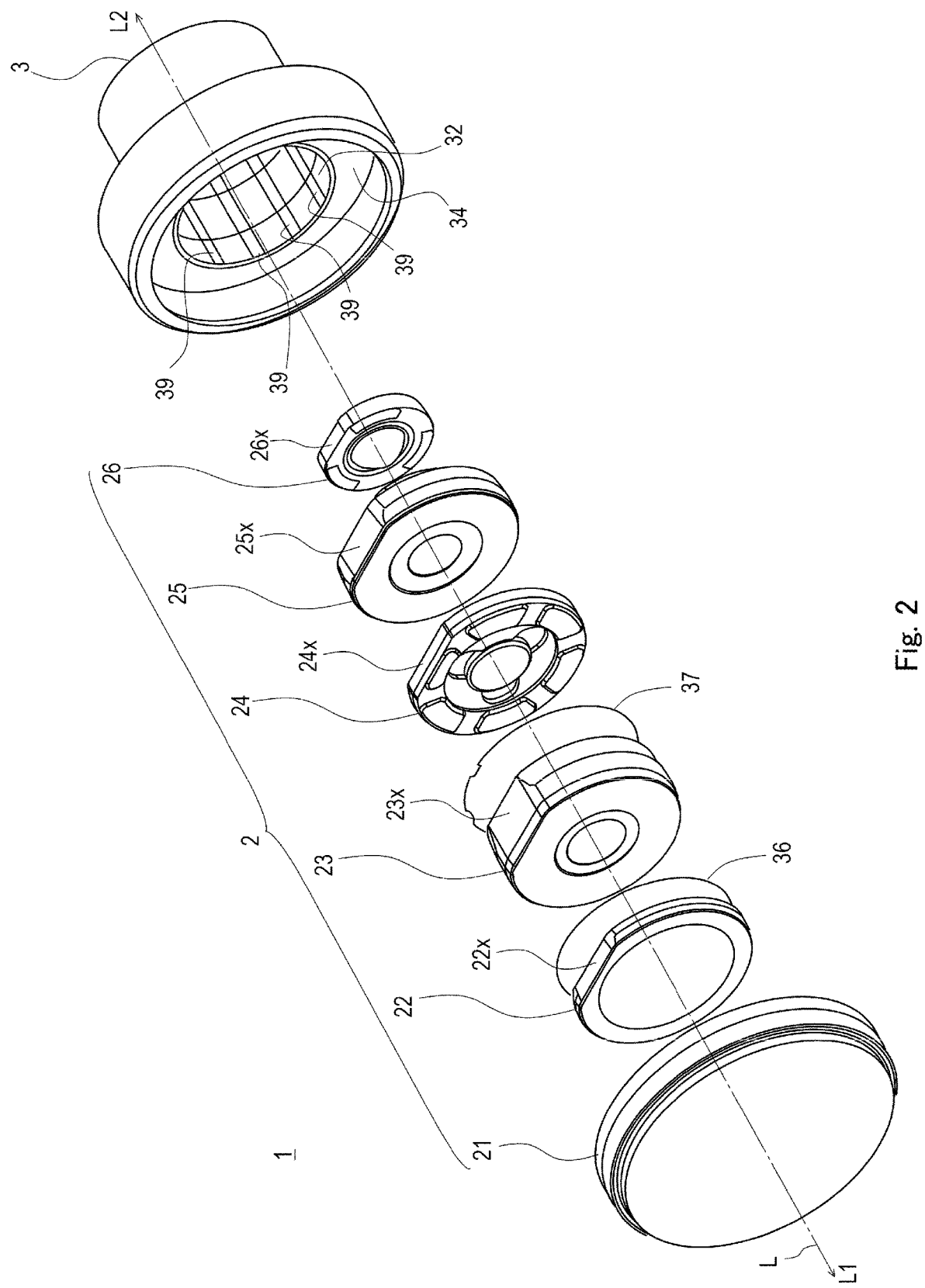
FIG. 2 is an exploded perspective view showing the lens unit in accordance with the first embodiment.

FIGS. 1(a), 1(b) and 1(c) are views showing an entire lens unit 1 in accordance with this embodiment. FIG. 1(a) is a perspective view, FIG. 1(b) is a front view, and FIG. 1(c) is a longitudinal cross-sectional view. FIG. 2 is an exploded perspective view showing the lens unit 1.

The lens unit 1 is a lens assembly which is assembled in an on-vehicle periphery monitoring camera, a monitoring camera, an intercom and the like. An "object side "L1"" and an "image side "L2"" in the present invention are an object side and an image side in an optical axis "L" direction and an "optical axis direction" is a direction which is parallel to an optical axis "L".

(Entire Structure)

The lens unit 1 includes a wide-angle lens 2 consisting of a plurality of lenses and a lens-barrel 3 which accommodates the wide-angle lens 2. The wide-angle lens 2 is configured of six lenses, i.e., a first lens 21, a second lens 22, a third lens 23, a fourth lens 24, a fifth lens 25 and a sixth lens 26 which are disposed in close contact from the object side "L1" toward the image side "L2" along the optical axis "L". In this embodiment, a light shielding sheet 36 which prevents light from entering to the image side is disposed on close contact between the second lens 22 and the third lens 23. Further, a diaphragm 37 is disposed on close contact between the third lens 23 and the fourth lens 24 (lens holder 4).

Among the lenses configuring the wide-angle lens 2, the first lens 21 is disposed on the most object side "L1". The second lens 22 is located on the image side "L2" of the first lens 21. The third lens 23 is located on the image side "L2" of the second lens 22. The fourth lens 24 is located on the image side L2 of the third lens 23. The fourth lens 24 is press-fitted and fixed to a lens holder 4 made of resin and is disposed in the lens-barrel 3 in a further reinforcingly fixed state by an adhesive. The fifth lens 25 is located on the image side "L2" of the fourth lens 24. The sixth lens 26 is located on the image side "L2" of the fifth lens 25. The fifth lens 25 and the sixth lens 26 configure a cemented lens.

A glass lens is used for the first lens 21 from a viewpoint that, even in a case that an object side lens face of the first lens 21 which is located on the most object side is exposed, scratches are hard to be left on the object side lens face of the first lens 21. A plastic lens is used for the second lens 22, the third lens 23, the fifth lens 25 and the sixth lens 26 from a viewpoint that workability and economical efficiency of a lens are excellent. A glass lens is used for the fourth lens 24 from a viewpoint that surface accuracy of a lens and optical characteristics such as a refractive index for temperature change are excellent.

The wide-angle lens 2 of the lens unit 1 in this embodiment is configured of six lenses. However, the number of pieces of a lens is not limited, the material of a lens is also not limited, and it may be configured that no cemented lens is provided.

The lens-barrel 3 is a cylindrical tube-shaped lens frame made of resin and is formed with an inner circumferential surface 32 toward the image side along outer circumferential faces of the respective lenses configuring the wide-angle lens 2. The inner circumferential surface 32 is formed with a plurality of press-fitting protruded parts 39 in a protruded shape (swelled shape) to an inner side in a radial direction with equal intervals in a circumferential direction. The second lens 22, the third lens 23, the lens holder 4 and the fifth lens 25 configuring the wide-angle lens 2 are press-fitted to the press-fitting protruded parts 39 and, in addition, their outer circumferential faces are supported by the inner circumferential surface 32 of the lens-barrel 3 and thereby they are positioned in the optical axis "L" direction.

Further, a flat part 25a formed in a periphery of an image side face of the fifth lens 25 is placed on a ring-shaped placing face 31 which is extended to an inner side in the circumferential direction on the image side of the lens-barrel 3. Further, a periphery of a face on the object side "L1" of the second lens 22 is fixed by a caulking part 35 provided at an end part of an object side inner circumferential surface of the lens-barrel 3.

As a result, the second lens 22, the third lens 23, the lens holder 4 (fourth lens 24), the fifth lens 25 and the sixth lens 26 are positioned in the optical axis "L" direction. In addition, an O-ring 5 is assembled to an outer peripheral portion of the first lens 21 and then, the first lens 21 to which the O-ring 5 has been assembled is assembled to a ring-shaped groove part 34. After that, a periphery of the first lens 21 is fixed by a caulking part 33 provided at an end part on the object side of the lens-barrel 3. The first lens 21 is positioned in the optical axis "L" direction in this process.

In this embodiment, from a viewpoint of preventing an error of inserting order of the second lens 22, the third lens 23, the lens holder 4 (fourth lens 24), the fifth lens 25 and the sixth lens 26, the lenses are formed so that their outer diameters are reduced toward the image side "L2", and the inner circumferential surface 32 is formed narrowly so as to correspond to the outer diameters. Further, in FIG. 2, upper side areas of the second lens 22, the third lens 23, the lens holder 4 (fourth lens 24), the fifth lens 25 and the sixth lens 26 are formed with "D"-cut parts 22x through 26x.
(Configuration of Second Lens)

Figure 3A:
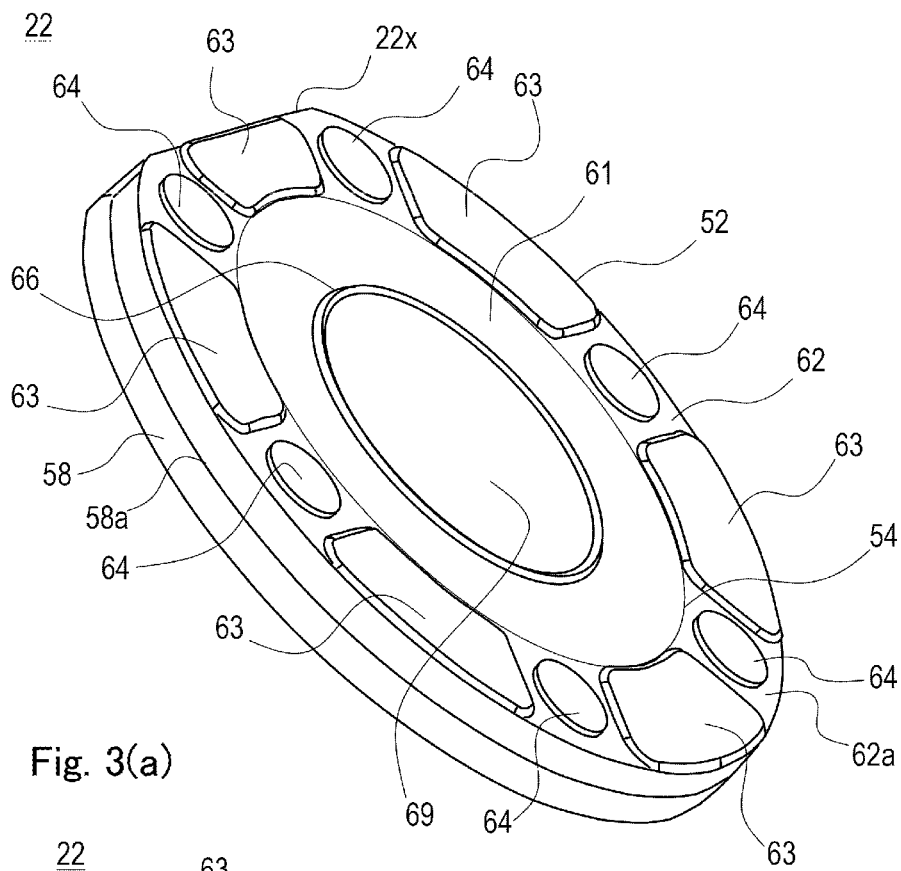
FIGS. 3(a) and 3(b) are perspective views showing a second lens in accordance with the first embodiment.
Figure 3B:
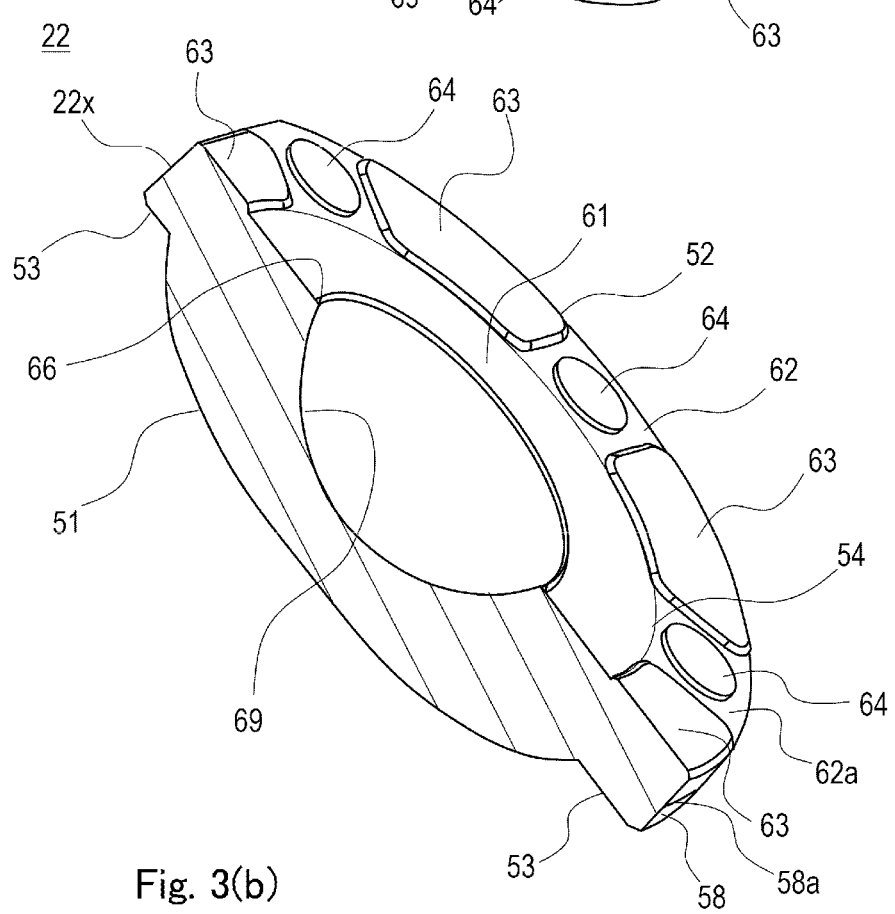
Figure 4A:
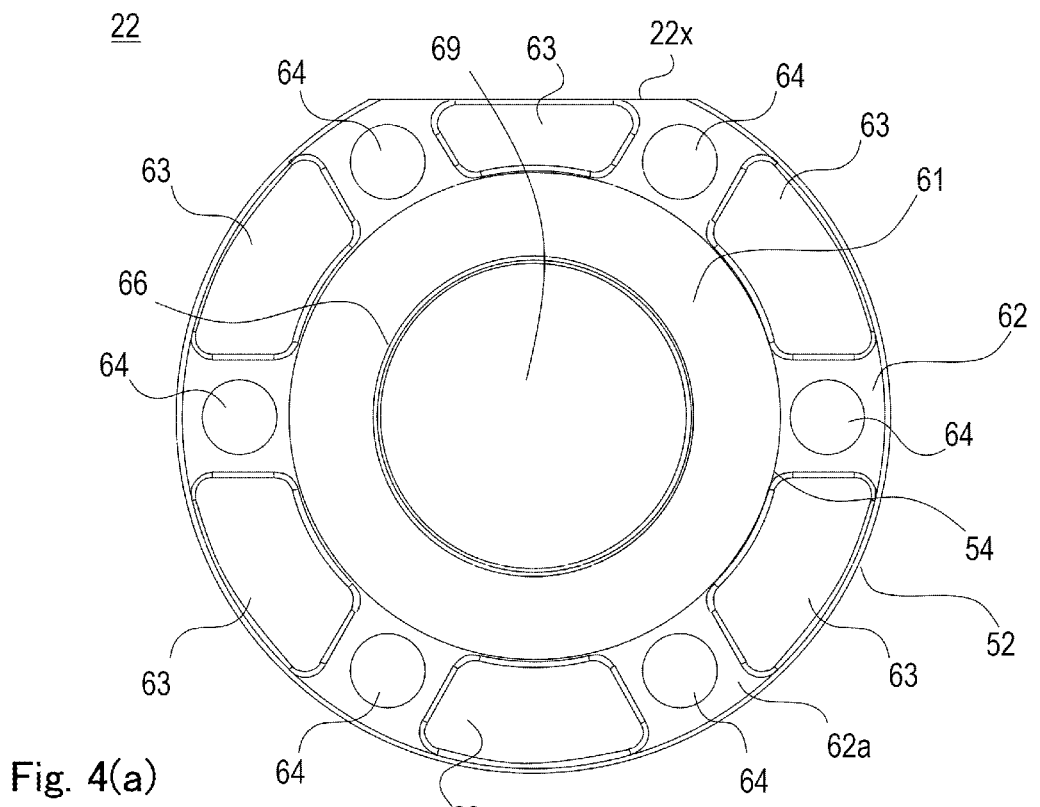
FIGS. 4(a) and 4(b) are views showing an image side face of the second lens in accordance with the first embodiment.
Figure 4B:
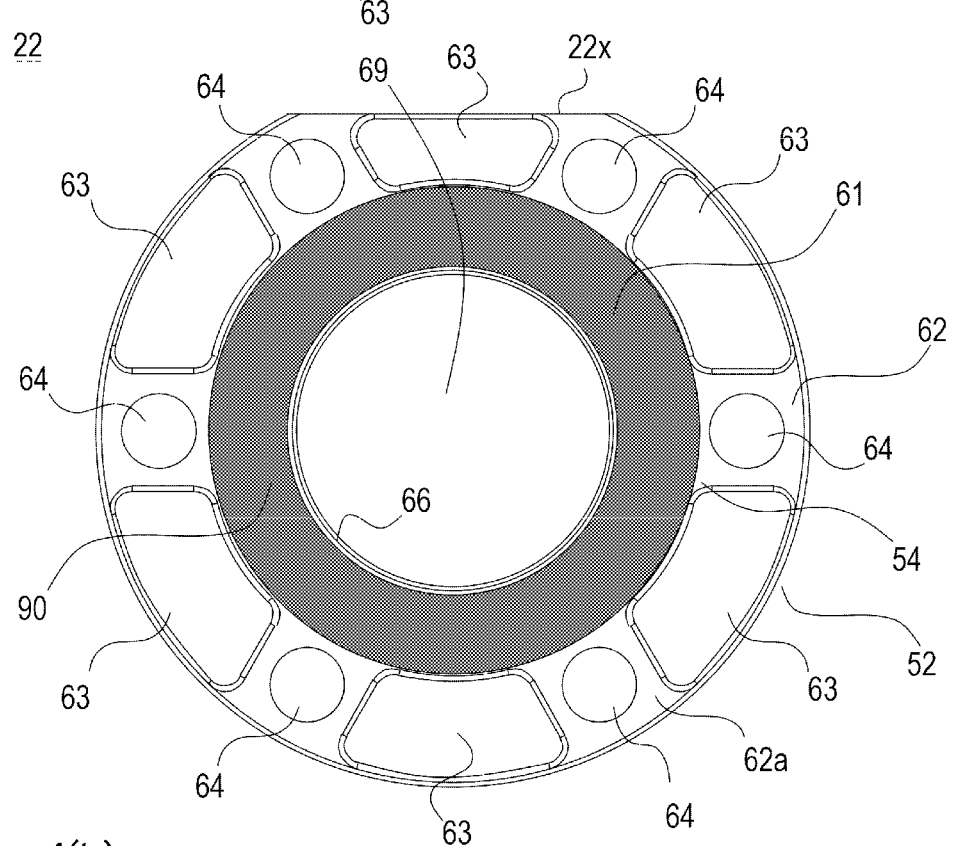

Next, the second lens 22 having a characteristic configuration in this embodiment will be described below. FIGS. 3(a) and 3(b) are perspective views showing the second lens 22. FIG. 3(a) shows the entire second lens 22 and FIG. 3(b) is its cross-sectional perspective view. FIGS. 4(a) and 4(b) are views showing the second lens 22. FIG. 4(a) is a plan view showing an image side "L2" face of the second lens 22 (in FIG. 1(c), a face on the third lens 23 side). Further, FIG. 4(b) shows a configuration where India ink 90 is applied to a part of the face.

In the second lens 22, the lens face is provided with a convex object side lens face 51 on the object side "L1" and a concave image side lens face 69 on the image side "L2". The second lens 22 is provided with a flange part 52 which surrounds an outer peripheral side of the lens face. In this embodiment, a part of the flange part 52 is formed to be the "D"-cut part 22x.

The object side "L1" of the flange part 52 is formed to be an object side flange face 53 which surrounds an outer peripheral side of the object side lens face 51, and its image side "L2" is formed to be an image side flange face 54 which surrounds the image side lens face 69.

The image side flange face 54 is formed to be a slightly recessed step shape on its inner side (in other words, the image side lens face 69 side). In other words, the image side flange face 54 is provided with an image side flange face inner peripheral part 61 in a ring and groove shape and an image side flange face outer peripheral part 62 in a ring shape which is provided on its outer side. The image side flange face outer peripheral part 62 is provided with a positioning face 63 described below. In other words, the image side flange face 54 of the flange part 52 is provided with the positioning face 63, which is formed on the outer peripheral side and is protruded to the optical axis "L" direction, and the image side flange face inner peripheral part 61 as a first step part which is formed on the inner peripheral side with respect to the positioning face 63 and is recessed in the optical axis "L" direction (more specifically, to the object side "L1") with respect to the positioning face 63. The image side flange face inner peripheral part 61 is coated with India ink 90. In other words, black coating is applied to the image side flange face inner peripheral part 61.

The image side flange face outer peripheral part 62 is provided with a flange face main body 62a as a second step part and a plurality of the positioning faces 63 in a boss shape (or protruded shape) which are protruded to the image side "L2" on the flange face main body 62a along its outer periphery. The positioning face 63 is closely contacted (abutted) with an object side face of the light shielding sheet 36 which is disposed between the second lens 22 and the third lens 23 to position the second lens 22 in the optical axis "L" direction. In this embodiment, the positioning face 63 is provided at six positions at an equal interval. In other words, the flange face main body 62a is formed as the second step part which is formed by one step higher on the outer peripheral side with respect to the image side flange face inner peripheral part 61 as the first step part and, in addition, the positioning faces 63 which are formed by one step higher are formed on the flange face main body 62a. The positioning face 63 of the "D"-cut part 22x is formed in a shape so that a part of another positioning face 63 is cut so as to correspond to the shape of the "D"-cut part 22x.

In the flange face main body 62a which is the second step part, ejector pin abutting parts 64 are formed between the positioning faces 63 adjacent to each other. In this embodiment, the ejector pin abutting part 64 is formed in a boss shape (or protruded shape) which is somewhat protruded from the flange face main body 62a. However, a protruding amount of the ejector pin abutting part 64 is smaller than a protruding amount of the positioning face 63. In other words, the ejector pin abutting parts 64 are formed so as not to obstruct a function as a reference surface of the positioning faces 63. As described below with reference to FIGS. 6(a), 6(b) and 6(c), ejector pins 74 are abutted with the ejector pin abutting parts 64 when separated from a metal mold 70 at the resin molding.

The object side flange face 53 is formed at a position facing the ejector pin abutting part 64 on the object side "L1". In this embodiment, it is structured that a position facing a center position of the ejector pin abutting part 64 is set to be the object side flange face 53 and is not the object side lens face 51. In this case, the ejector pin abutting part 64 may not be limited to the structure of a protruded shape as described above. For example, the ejector pin abutting part 64 may be provided on the same plane as the flange face main body 62a which is the second step part, and alternatively, the ejector pin abutting part 64 may be formed in a recessed shape with respect to the image side flange face outer peripheral part 62. Further, it may be structured that the ejector pin abutting part 64 has been provided in advance at a position where the object side flange face 53 is avoided.

Figure 5A:
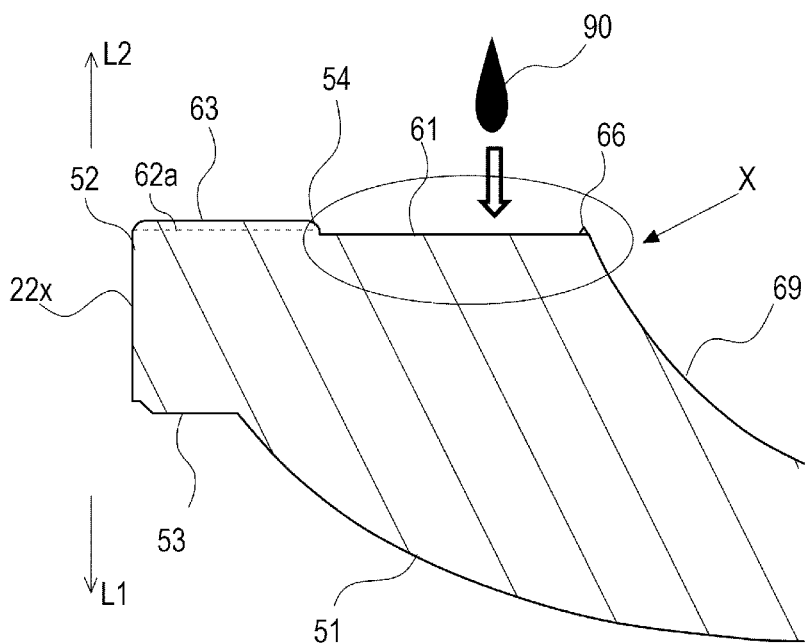
FIGS. 5(a) through 5(d) are views showing a cross-sectional configuration of a flange part of the second lens in accordance with the first embodiment.
Figure 5B:
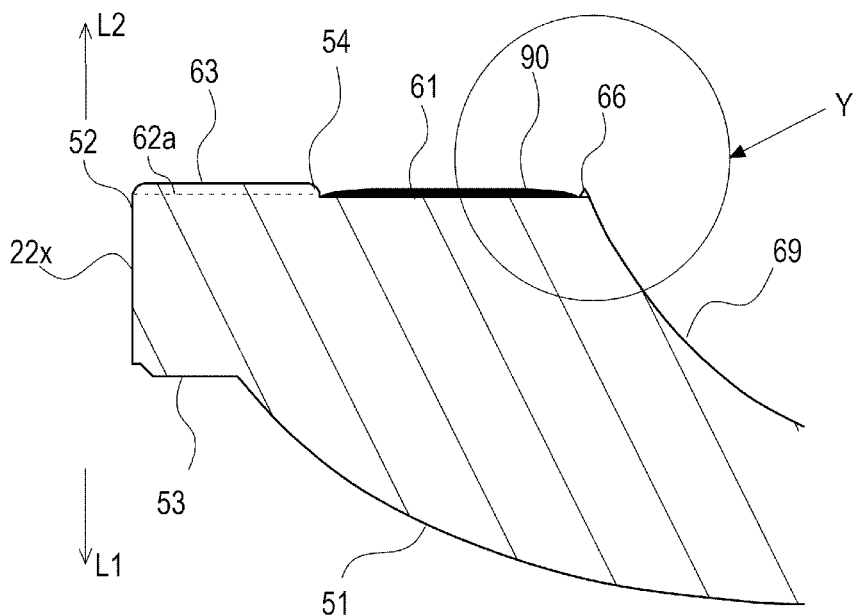
Figure 5C:
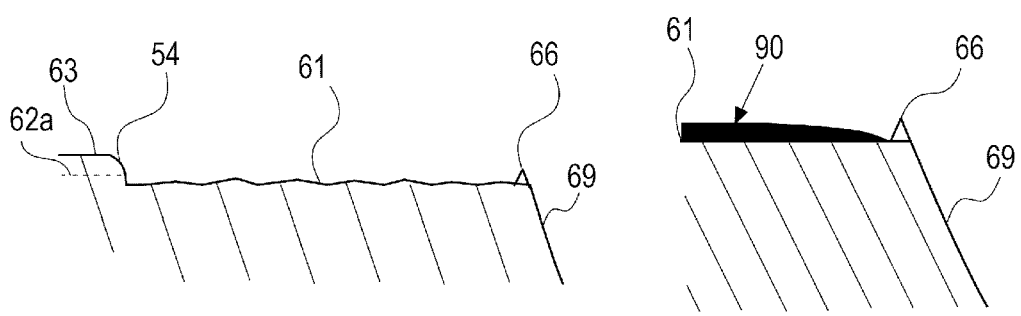
Figure 5D:
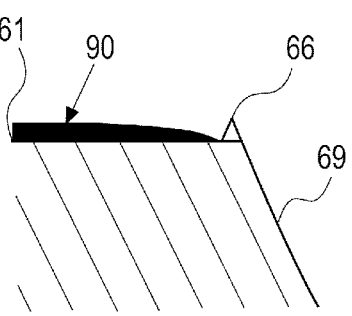

FIGS. 5(a) through 5(d) show a cross-sectional configuration of the flange part 52 of the second lens 22. These are configurations which are cut from the "D"-cut part 22x to a facing position. FIG. 5(a) shows a state before India ink 90 is applied, FIG. 5(b) shows a state that the India ink 90 has been applied, FIG. 5(c) shows an enlarged image side flange face inner peripheral part 61 in FIG. 5(a), and FIG. 5(d) shows an enlarged boundary area "Y" between the image side lens face 69 and the image side flange face inner peripheral part 61 in FIG. 5(b).

The image side flange face inner peripheral part 61 is slightly recessed to the object side "L1" with respect to the image side flange face outer peripheral part 62 and India ink 90 is applied as shown in FIG. 4(b) and FIG. 5(b). When the India ink 90 is applied to the image side flange face inner peripheral part 61 and a black coated part is provided, a ghost occurred by the flange part 52 of the second lens 22 can be suppressed. The India ink 90 functions to prevent light diffusion by India ink color and, in addition, a boundary face between the image side flange face inner peripheral part 61 and air is eliminated by the India ink 90 and an inner face reflectance is reduced.

Further, as shown in FIG. 5(c), the image side flange face inner peripheral part 61 is formed with minute protrusions and recesses or fine irregularities. Especially, in a case that the second lens 22 is a plastic lens, the India ink 90 may be shed and repelled and coating is not stabilized or is not made thin. However, when provided with minute protrusions and recesses, the applied India ink 90 is prevented from flowing and a proper amount can be applied to an appropriate region.

Further, as mainly shown in FIG. 5(d), a boundary portion between the image side flange face inner peripheral part 61 and the image side lens face 69 may be formed with a burr 66 which is projected to the image side "L2". The burr 66 is formed when the second lens 22 is molded.

FIGS. 6(a), 6(b) and 6(c) are views schematically showing a molding process (cross-sectional process drawing) of the second lens. The second lens 22 is manufactured by resin molding by using a metal mold 70 having a movable mold 71 and a fixed mold 72. As shown in a molding process in FIG. 6(a), in a state that the movable mold 71 on the right side in the drawing and the fixed mold 72 on the left side are closed, resin is injected from a gate into an inside of the metal mold 70.

The movable mold 71 and the fixed mold 72 are arranged so that a side of the image side lens face 69 and the image side flange face 54 correspond to the movable mold 71 and a side of the object side lens face 51 and the object side flange face 53 correspond to the fixed mold 72. Further, a boundary between the movable mold 71 and the fixed mold 72 is located at the lens side face 58 (approximately, in the vicinity of the center) of the second lens 22. A parting line 58a of the second lens 22 is formed by the boundary as shown in a molded article separating process in FIG. 6(c). Further, a gate port is located in a portion of the "D"-cut part 22x of the lens side face 58.

As shown in a mold opening process in FIG. 6(b), the movable mold 71 and the fixed mold 72 are separated from each other at a timing when the resin is hardened. In this case, the second lens 22 is separated from the fixed mold 72 and is maintained in a fixed state to the movable mold 71. After that, as shown in the molded article separating process in FIG. 6(c), the ejector pins 74 provided in the movable mold 71 push out the second lens 22 through the ejector pin abutting parts 64 and the second lens 22 is separated from the movable mold 71.

In this case, the position where the ejector pin 74 is abutted (in other words, the ejector pin abutting part 64) is set to face the object side flange face 53 of the flange part 52. Therefore, an adverse effect such as distortion is not given to a shape of the lens face (specifically, the object side lens face 51) due to a pushing-out operation of the ejector pin 74 for the second lens 22. Further, in the plastic lens molding process, the ejector pin 74 is set in a state that the ejector pin 74 is disposed on an image side with respect to the image side flange face forming face of the image side flange face forming mold 77 for forming the image side flange face 54 and the like which are a face on the image side of the flange part 52. In other words, for example, in a case that the ejector pin 74 is set in a state that the ejector pin 74 is disposed on the object side with respect to the image side flange face forming face of the image side flange face forming mold 77 (a state that a tip end of the ejector pin 74 is protruded from the image side flange face forming face), the ejector pin abutting part 64 of the second lens 22 having been molded is formed in a recessed shape. Therefore, at the time of a pushing-out process for pushing out the second lens 22 by the ejector pins 74, the tip ends of the ejector pins 74 are fitted to the ejector pin abutting parts 64 in the recessed shape and thus, the second lens 22 may be hard to be separated from the ejector pins 74 (movable mold 71). On the other hand, when the ejector pin 74 is set in a state that the ejector pin 74 is disposed on an image side with respect to the image side flange face forming face, it can be prevented that the second lens 22 is hard to be separated from the ejector pins 74 (movable mold 71).

When the second lens 22 is to be detached from the metal mold 70 at the time of resin molding, more specifically, when the second lens 22 is to be detached from the movable mold 71 by the ejector pins 74, the burr 66 as described above may be formed in a ring shape at a boundary between the image side lens face 69 and the image side flange face inner peripheral part 61. The burr 66 is a minute ring-shaped protruded part which is formed by resin injected between an image side lens face forming mold 78 forming the image side lens face 69 and an image side flange face forming mold 77 forming the image side flange face 54 and the like. As shown in FIG. 5(d), the India ink 90 can be prevented from flowing to the image side lens face 69 when India ink 90 is applied. In this embodiment, a protruding amount of the burr 66 is about several μm. Further, arrangement of the image side lens face forming mold 78 and the image side flange face forming mold 77 may be modified further precisely so that the burr 66 is not formed.

Further, when the image side flange face inner peripheral part 61 is formed to be located on the object side in the optical axis "L" direction with respect to the positioning face 63, the position in the optical axis direction of the second lens 22 is prevented from varying due to a thickness of the India ink 90 by black coating. Therefore, degradation of the optical performance can be prevented. In this embodiment, the thickness of the India ink 90 is about 30 μm at the maximum. Therefore, a distance from the image side flange face inner peripheral part 61 to a tip end of the positioning face 63 may be set about 50 μm, and naturally, the distance may be adjusted depending on a thickness of the India ink 90 which is applied.

The features of this embodiment described above will be briefly summarized as follows. A boundary surface between the image side flange face 54 and air which may be a cause of reflection is eliminated by the India ink 90 and thus, the inner face reflectance can be reduced. In other words, since the India ink 90 is applied to the image side flange face 54 (image side flange face inner peripheral part 61) of the flange part 52 of the second lens 22, a ghost generated by the flange part 52 of the second lens 22 can be suppressed.

Further, since the image side flange face inner peripheral part 61 is formed so that the image side flange face inner peripheral part 61 is located on the object side in the optical axis direction with respect to the image side flange face outer peripheral part 62, more specifically, the positioning face 63, the position in the optical axis "L" direction of the second lens 22 does not change due to a thickness of the India ink 90. Therefore, the optical performance is not deteriorated.

Further, since the ejector pin abutting part 64 is provided, the ejector pin abutting part 64 can be utilized as a push-out portion by the ejector pin 74 which is used for separating the second lens 22 from the metal mold 70 at the time of molding of the second lens 22.

Further, at least a part of the ejector pin abutting part 64 (especially, center portion where the ejector pin 74 is abutted) is formed at a position facing the object side flange face 53 of the flange part 52. Therefore, in the pushing-out process by the ejector pin 74, a force of the ejector pin 74 can be prevented from directly acting on the object side lens face 51 and the image side lens face 69 and, in other words, the lens face can be prevented from being deformed or the like.

Further, the India ink 90 can be prevented from spreading over the image side lens face 69 by the burr 66 in a ring and protruded shape.

Further, the image side flange face inner peripheral part 61 is a ring-shaped groove which is recessed to the object side in the optical axis direction with respect to the image side flange face outer peripheral part 62 and thus, an applied position and applied amount of the India ink 90 can be easily adjusted.

The second lens 22 is a plastic lens and thus, India ink is easily shed and repelled and the applied India ink 90 is not stable. However, the image side flange face inner peripheral part 61 is an uneven surface and thus, the applied India ink 90 can be stabilized and coating can be optimized.

The light shielding sheet 36 is provided between the second lens 22 and the third lens 23 and thus, light can be prevented from passing to the image side. In other words, unnecessary light can be shaded completely.

Second Embodiment

Figure 7A:
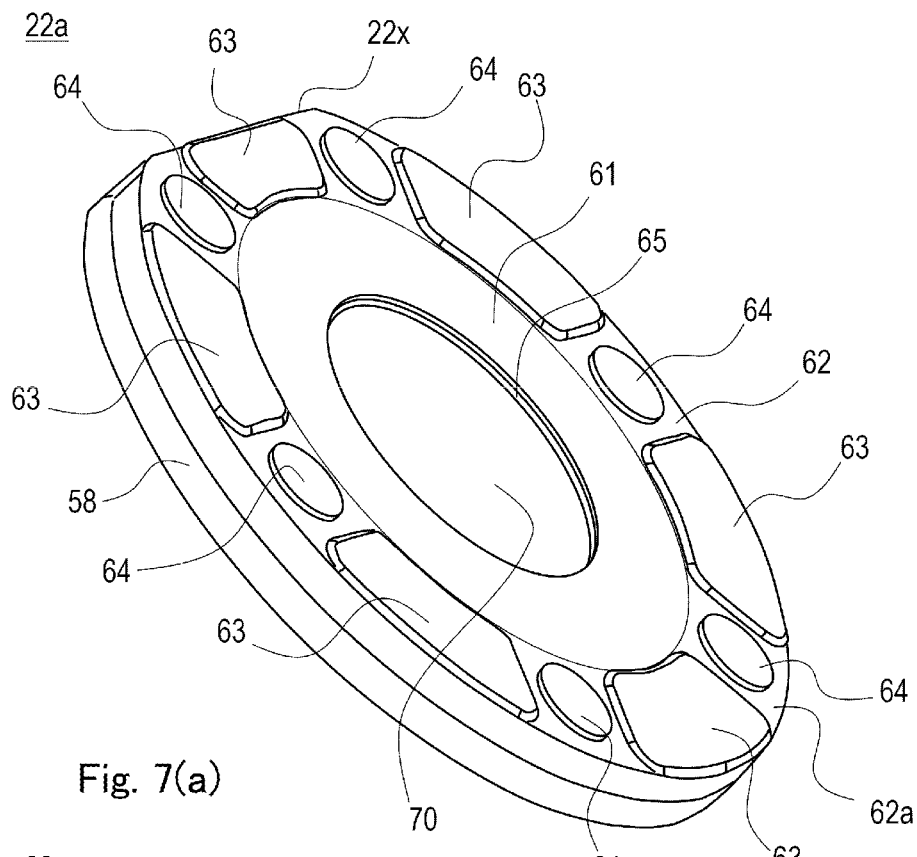
FIGS. 7(a) and 7(b) are perspective views showing a second lens in accordance with a second embodiment.
Figure 7B:
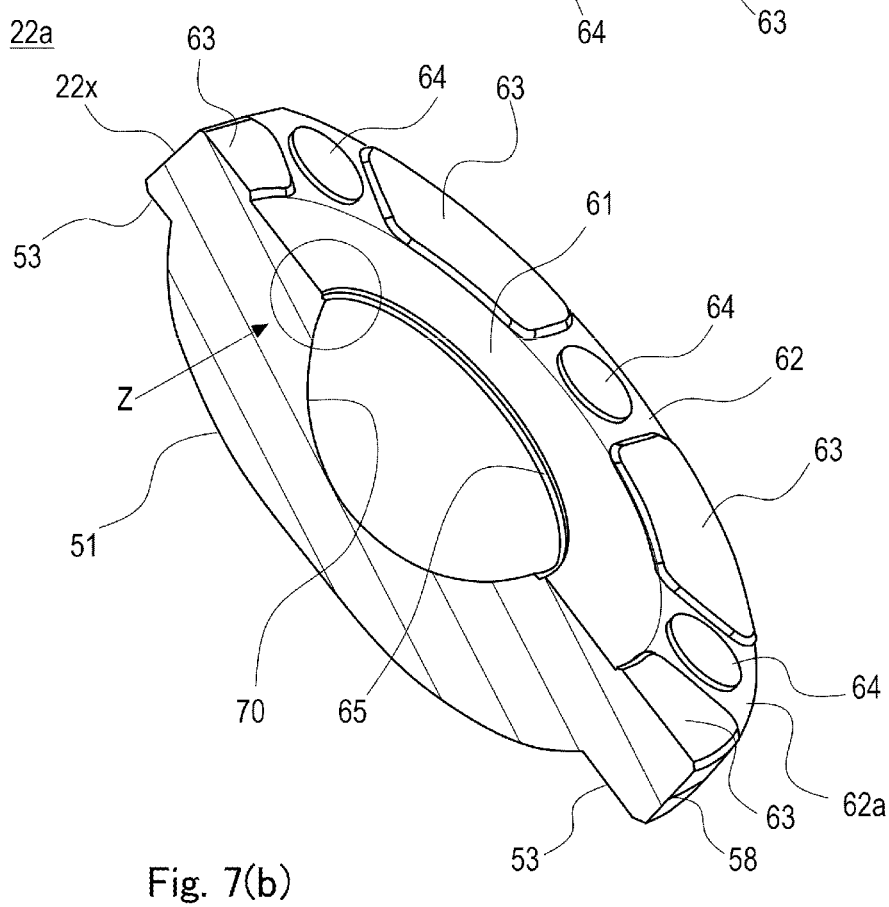
Figure 8:
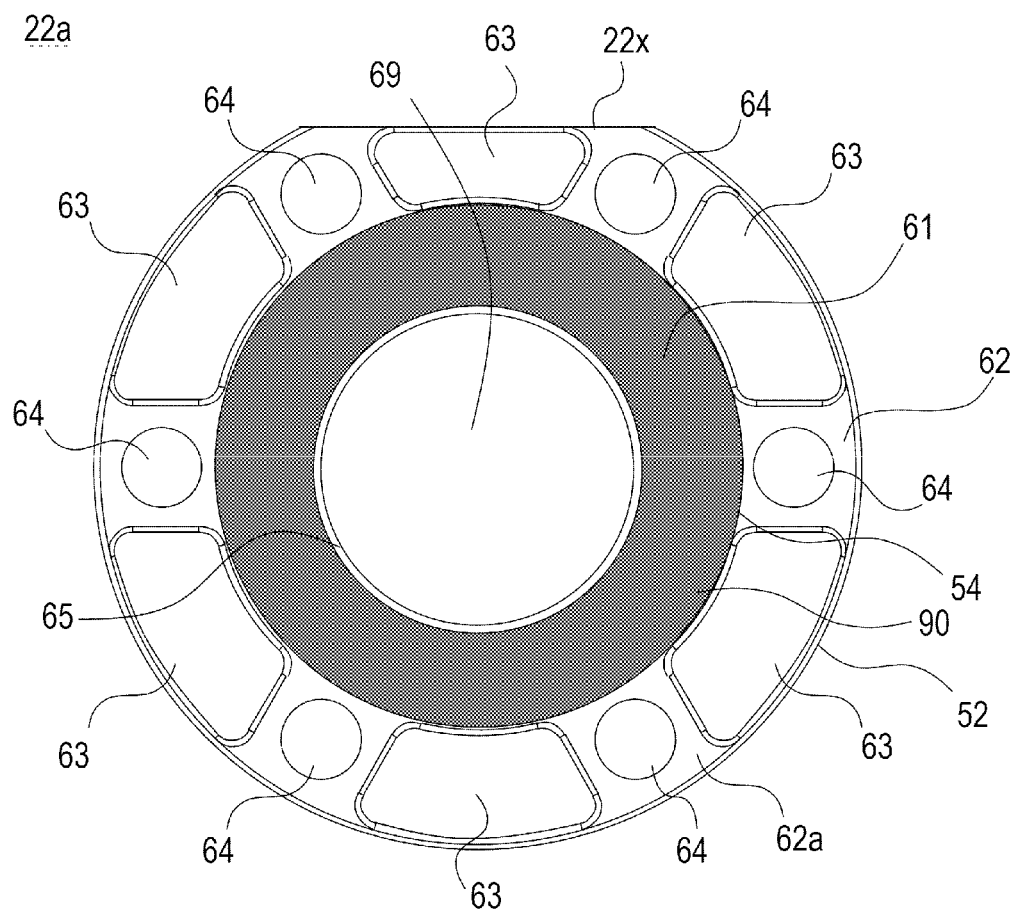
FIG. 8 is a view showing an image side face of the second lens in accordance with the second embodiment.
Figure 9A:
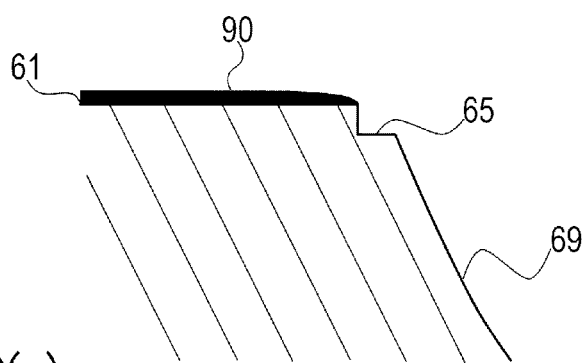
FIGS. 9(a) and 9(b) are enlarged views showing a boundary portion between an image side flange face inner peripheral part and an image side lens face in accordance with the second embodiment.
Figure 9B:
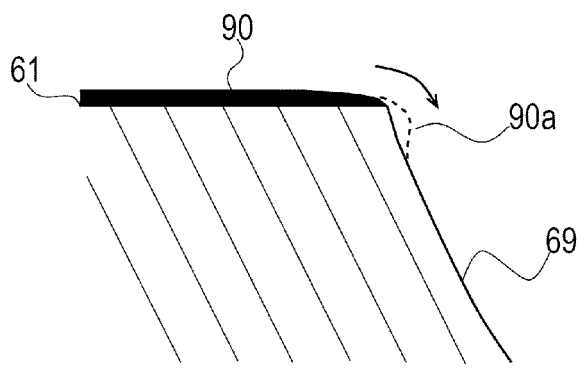

A second lens 22a in a second embodiment will be described below with reference to FIGS. 7(a) through 9(b). In the second lens 22a in this embodiment, a shape of a boundary portion between the image side flange face inner peripheral part 61 and the image side lens face 69 is different from the shape in first embodiment. In the following descriptions, portions different from the first embodiment will be mainly described and the descriptions of the similar configurations and functions are appropriately omitted. FIGS. 7(a) and 7(b) are perspective views showing the second lens 22a. FIG. 7(a) shows the entire second lens 22a and FIG. 7(b) is its cross-sectional perspective view. FIG. 8 is a plan view showing a face on the image side "L2" of the second lens 22a. FIGS. 9(a) and 9(b) are enlarged views showing a boundary portion (area "Z" in FIG. 7(b)) between an image side flange face inner peripheral part 61 and an image side lens face 69. FIG. 9(a) shows a state that India ink 90 is applied, and FIG. 9(b) shows a state that India ink 90 is applied to a configuration where a third step part 65 is not formed. In this embodiment, a case will be described below that precision of the above-mentioned metal mold 70 (especially, arrangement of the image side lens face forming mold 78 and the image side flange face forming mold 77) is improved and a burr 66 is not formed in a boundary of the image side flange face inner peripheral part 61.

A boundary portion between the image side flange face inner peripheral part 61 and the image side lens face 69 is formed with a third step part 65 in a recessed shape to the object side in the optical axis direction. In other words, the third step part 65 is formed in a step shape so that a ring-shaped step is recessed to the object side by one step in the optical axis direction. More specifically, the third step part 65 is a step part which is recessed at a substantially right angle (90 degrees) from the image side flange face inner peripheral part 61.

In comparison with the configuration that the third step part is not formed in a boundary portion between the image side flange face inner peripheral part 61 and the image side lens face 69 as shown in FIG. 9(b), in the configuration that the third step part 65 as shown in FIG. 9(a) is formed, an edge is provided in the boundary portion between the image side flange face inner peripheral part 61 and the image side lens face 69. Therefore, the surface tension of the India ink 90 is easily generated and thus, the India ink 90 applied to the image side flange face inner peripheral part 61 can be prevented from spreading to the image side lens face 69 (India ink 90a shown by the broken line) as shown in FIG. 9(b).

Although the present invention has been shown and described with reference to a specific embodiment. However, this embodiment is only an example and various changes and modifications will be apparent to those skilled in the art from the teachings herein and it will be understood that many modifications may be made without departing from the spirit of the present invention.

What is claimed is:

1. A lens unit comprising:
   a first lens which is disposed on a most object side;
   a plurality of lenses which are disposed on an image side with respect to the first lens; and
   a lens-barrel which holds the first lens and the plurality of the lenses;
   wherein among the plurality of the lenses, a second lens which is disposed on a most object side is a plastic lens, the second lens comprising a flange part which surrounds a lens face of the second lens;
   wherein an image side flange face of the flange part comprises a plurality of positioning faces which are formed on an outer peripheral side and are protruded in an optical axis direction, and a first step part which is provided on an inner peripheral side with respect to the positioning faces and is recessed to an object side in the optical axis direction with respect to the positioning faces;
   wherein black coating is applied to the first step part,
   wherein the plurality of the positioning faces are configured along an outer periphery of the flange part, and
   a second step part which is lower than the positioning faces is formed between the positioning faces, and
   wherein the first step part is a ring-shaped groove which is recessed to the object side in the optical axis direction with respect to the second step part.

2. The lens unit according to claim 1, wherein the second step part is formed with an ejector pin abutting part, and
   at least a part of the ejector pin abutting part is formed at a position facing an object side flange face of the flange part.

3. The lens unit according to claim 2, wherein a light shielding sheet is provided between the second lens and a third lens adjacent to the second lens on the image side.

4. The lens unit according to claim 1, wherein in the lens face of the second lens, a boundary portion between an image side lens face and the first step part is formed with a minute ring-shaped protruded part protruding to the image side in the optical axis direction.

5. The lens unit according to claim 4, wherein a light shielding sheet is provided between the second lens and a third lens adjacent to the second lens on the image side.

6. The lens unit according to claim 1, wherein the first step part is an uneven surface on which minute protrusions and recesses are provided.

7. The lens unit according to claim 6, wherein a light shielding sheet is provided between the second lens and a third lens adjacent to the second lens on the image side.

8. The lens unit according to claim 1, wherein a third step part which is recessed to the object side in the optical axis direction is formed in a boundary portion between an image side lens face and the first step part.

9. The lens unit according to claim 1, wherein a light shielding sheet is provided between the second lens and a third lens adjacent to the second lens on the image side.

\* \* \* \* \*